United States Patent
Ganti et al.

(10) Patent No.: US 10,832,680 B2
(45) Date of Patent: Nov. 10, 2020

(54) SPEECH-TO-TEXT ENGINE CUSTOMIZATION

(71) Applicant: INTERNATIONAL BUSINESS MACHINES CORPORATION, Armonk, NY (US)

(72) Inventors: Raghu Kiran Ganti, Elmsford, NY (US); Shreeranjani Srirangamsridharan, White Plains, NY (US); Mudhakar Srivatsa, White Plains, NY (US); Dakshi Agrawal, Monsey, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 198 days.

(21) Appl. No.: 16/201,447

(22) Filed: Nov. 27, 2018

(65) Prior Publication Data

US 2020/0168226 A1     May 28, 2020

(51) Int. Cl.
| | |
|---|---|
| *G10L 15/00* | (2013.01) |
| *G10L 15/26* | (2006.01) |
| *G06F 3/16* | (2006.01) |
| *G06F 40/279* | (2020.01) |

(52) U.S. Cl.
CPC .............. *G10L 15/26* (2013.01); *G06F 3/167* (2013.01); *G06F 40/279* (2020.01)

(58) Field of Classification Search
None
See application file for complete search history.

(56) References Cited

U.S. PATENT DOCUMENTS

| | | |
|---|---|---|
| 6,269,335 B1 | 7/2001 | Ittycheriah et al. |
| 6,574,597 B1 | 6/2003 | Mohri et al. |
| 6,912,498 B2 | 6/2005 | Stevens et al. |
| 7,483,832 B2 | 1/2009 | Tischer |
| 9,817,809 B2 | 11/2017 | Shostak |
| 9,916,304 B2 * | 3/2018 | Fujiwara ................ G06F 40/45 |
| 10,318,642 B2 * | 6/2019 | Fujiwara ................ G06F 40/51 |
| 10,409,848 B2 * | 9/2019 | Tsuchida ............... G06F 16/374 |
| 10,474,969 B1 * | 11/2019 | Abdi Taghi Abad ........................ G06Q 30/016 |
| 10,482,185 B1 * | 11/2019 | Abdi Taghi Abad ........................ G06F 40/247 |
| 10,489,701 B2 * | 11/2019 | Weston ............. G06F 16/24578 |
| 10,529,320 B2 * | 1/2020 | Shafran .................. G10L 15/16 |
| 10,592,544 B1 * | 3/2020 | Dasgupta ............... G06N 5/025 |
| 2005/0080613 A1 | 4/2005 | Colledge et al. |
| 2005/0080625 A1 | 4/2005 | Bennett et al. |
| 2006/0136195 A1 | 6/2006 | Agapi et al. |
| 2008/0133244 A1 | 6/2008 | Bodin et al. |
| 2010/0042414 A1 | 2/2010 | Lewis et al. |

(Continued)

*Primary Examiner* — Satwant K Singh
(74) *Attorney, Agent, or Firm* — Cantor Colburn LLP; Joseph Petrokaitis

(57) ABSTRACT

Systems, methods, and computer-readable media are described for automatically identifying potential errors in the text output of a domain-agnostic speech-to-text engine and generating text snippets that contain words representative of the potential errors and other words in the neighborhoods of such words for context. In this manner, a substantially reduced amount of text (i.e., the text snippets) can be reviewed for errors in the speech-to-text conversion rather than the entire text output, thereby significantly reducing the burden associated with error identification in the text output.

20 Claims, 4 Drawing Sheets

(56) References Cited

U.S. PATENT DOCUMENTS

| | | |
|---|---|---|
| 2018/0032503 A1 | 2/2018 | Swart et al. |
| 2019/0121849 A1* | 4/2019 | Taraba .............. G06F 16/90335 |
| 2019/0294257 A1* | 9/2019 | Chen ....................... G06F 3/023 |
| 2019/0362645 A1* | 11/2019 | Miller ..................... G06N 5/041 |
| 2020/0111483 A1* | 4/2020 | Shafran ................... G10L 15/02 |

\* cited by examiner

SPEECH-TO-TEXT ENGINE CUSTOMIZATION

BACKGROUND

The present invention relates generally to speech-to-text engines, and more particularly, to automatically identifying potential errors in the text output of a speech-to-text engine and using the identified potential errors to customize the speech-to-text engine.

Speech-to-text engines can be deployed in various enterprises to capture and analyze customer conversations. For example, most large companies use speech-to-text engines and associated algorithms to answer customer phone calls and provide verbal instructions to the caller to make various selections to navigate through menu options. The selections can be made by pressing buttons on a touch-tone device or providing voice input.

SUMMARY

In one or more example embodiments of the invention, a computer-implemented method for automated identification of one or more potential errors in a text output of a speech-to-text engine is disclosed. The method includes receiving the text output of the speech-to-text engine and determining a first vector representation of a first word in the text output and a second vector representation of a second word in the text output. The method further includes determining that the first vector representation and the second vector representation satisfy a similarity threshold and determining that the first word and the second word form a synonym cluster based at least in part on determining that the first vector representation and the second vector representation satisfy the similarity threshold, where the synonym cluster is indicative of a potential error in the text output. The method additionally includes generating a text snippet from the text output, where the text snippet comprises at least the first word and the second word.

In one or more other example embodiments of the invention, a system for automated identification of one or more potential errors in a text output of a speech-to-text engine is disclosed. The system includes at least one memory storing computer-executable instructions and at least one processor configured to access the at least one memory and execute the computer-executable instructions to perform a set of operations. The operations include receiving the text output of the speech-to-text engine and determining a first vector representation of a first word in the text output and a second vector representation of a second word in the text output. The operations further include determining that the first vector representation and the second vector representation satisfy a similarity threshold and determining that the first word and the second word form a synonym cluster based at least in part on determining that the first vector representation and the second vector representation satisfy the similarity threshold, where the synonym cluster is indicative of a potential error in the text output. The operations additionally include generating a text snippet from the text output, where the text snippet comprises at least the first word and the second word.

In one or more other example embodiments of the invention, a computer program product for automated identification of one or more potential errors in a text output of a speech-to-text engine is disclosed. The computer program product includes a non-transitory storage medium readable by a processing circuit, the storage medium storing instructions executable by the processing circuit to cause a method to be performed. The method includes receiving the text output of the speech-to-text engine and determining a first vector representation of a first word in the text output and a second vector representation of a second word in the text output. The method further includes determining that the first vector representation and the second vector representation satisfy a similarity threshold and determining that the first word and the second word form a synonym cluster based at least in part on determining that the first vector representation and the second vector representation satisfy the similarity threshold, where the synonym cluster is indicative of a potential error in the text output. The method additionally includes generating a text snippet from the text output, where the text snippet comprises at least the first word and the second word.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
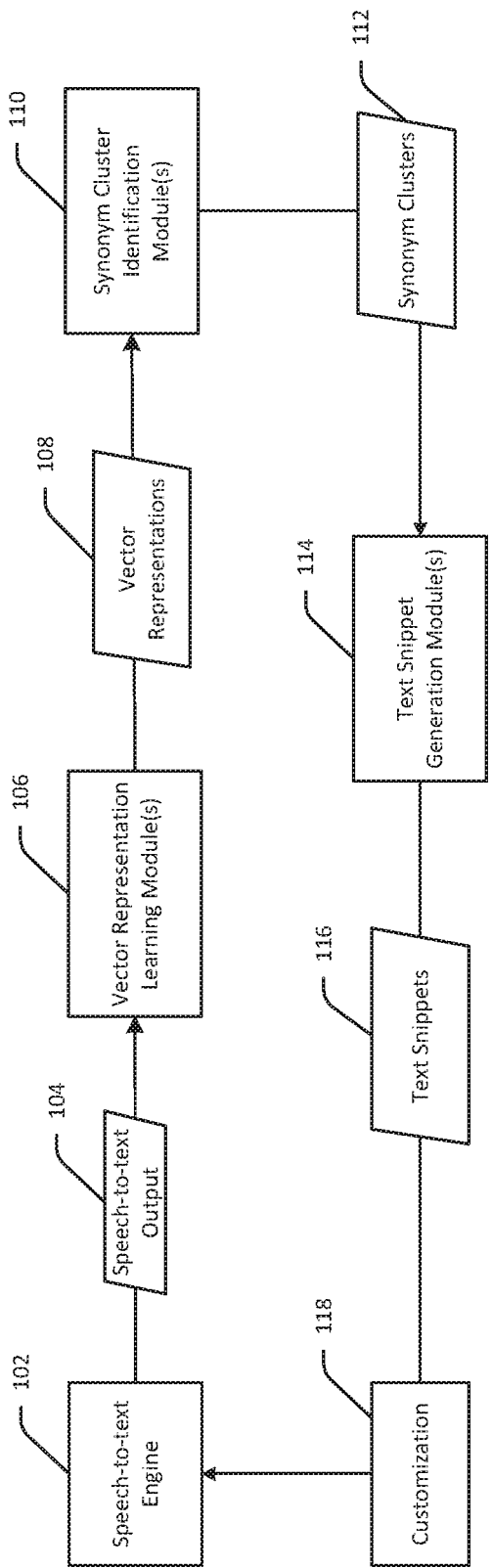
FIG. 1 is a schematic hybrid data flow/block diagram illustrating the automated identification of one or more potential errors in a text output of a speech-to-text engine in accordance with one or more example embodiments of the invention.

Known speech-to-text engines suffer from a number of technical drawbacks including, for example, the inability to efficiently customize them with respect to a specific domain. Technical solutions to this and other drawbacks associated with conventional speech-to-text engines are described herein. Example embodiments of the invention relate to, among other things, devices, systems, methods, computer-readable media, techniques, and methodologies for identifying, in an automated manner, potential errors in the text output of a speech-to-text engine. In example embodiments of the invention, the speech-to-text engine is a domain-agnostic speech-to-text engine that is not customized or trained for any specific domain (e.g., enterprise). As such, in example embodiments of the invention, a non-customized speech-to-text engine may encounter difficulty in converting domain-specific speech to text, potentially resulting in errors in the text output. A conventional approach for addressing this potential for error in the text output of a domain-agnostic speech-to-text engine with respect to domain-specific speech involves manually reviewing the text output to identify errors. If errors are identified, the speech-to-text engine may be customized (e.g., re-trained) to correctly recognize the speech that was interpreted erroneously. This conventional approach, however, is cumbersome because it involves manually reviewing text output of a speech-to-text engine to identify errors, which may be difficult to find if such errors occur infrequently in a large text output.

Example embodiments of the invention significantly reduce the burden associated with manual review of text output of a speech-to-text engine by automatically identifying potential errors in the text output and generating text snippets that contain words representative of the potential errors and other words in the neighborhoods of such words for context. Thus, example embodiments of the invention facilitate review of a substantially reduced amount of text (i.e., the text snippets) rather than the entire text output, thereby significantly reducing the burden associated with error identification in the text output. Moreover, in example embodiments of the invention, the text snippets are specifically formed to include word relationships that are indicative of potential errors in the text output, and thus, further enhance the likelihood of locating errors in the text output. As such, the automated generation of text snippets that include portions of text output that are more likely to contain errors in accordance with example embodiments of the invention constitutes a technical benefit over conventional speech-to-text engine customization approaches because it enables errors in the text output of a non-customized speech-to-text engine to be pinpointed with greater accuracy and speed, thereby improving the rate at which the speech-to-text engine can be customized to respond more accurately to domain-specific speech. This technical benefit constitutes an improvement to computer technology and an improvement to the functioning of a computer with respect to speech-to-text conversion.

In example embodiments of the invention, text output is received from a domain-agnostic speech-to-text engine at a network edge device such as a computing device at a financial institution or a telecom operator. In example embodiments of the invention, the domain-agnostic speech-to-text engine has been trained on a public corpus such as a news corpus. In example embodiments of the invention, the text output is converted from audio of a customer conversation, but may exclude personally identifying information (PII) of the customer. Further, the network edge device may not receive the raw audio data of a customer conversation to avoid disclosure of PII.

Upon receipt of the text output of the domain-agnostic speech-to-text engine, the network edge device may be configured to learn vector representations of words in the text output and identify synonym relationships between words based on their vector representations. In example embodiments of the invention, a synonym relationship between two words exists if the neighborhoods of words around the two words are similar. If a synonym relationship exists between two words, the words may form part of a synonym cluster. Words in a synonym cluster may also be in the neighborhood of one another. In example embodiments of the invention, each such synonym cluster in the text output is identified and snippets of the text output are generated that contain the synonym clusters and words in the neighborhoods around the synonym clusters. These text snippets may be reviewed for potential errors, and if an error in the speech-to-text conversion is identified, the speech-to-text engine may be re-trained to accurately interpret the erroneous word(s).

In example embodiments of the invention, the identification of a synonym cluster based on the similarity in the vector representations of its constituent words may serve to reveal an anomalous relationship between the words in the synonym cluster. In an example use case scenario, assume that a non-customized domain-agnostic speech-to-text engine is being used to convert customer conversations relating to the telecom industry into text. Because the speech-to-text engine is not customized for use in connection with the telecom industry, certain words that have an established meaning within that industry may not be accurately interpreted by the engine. For instance, the word "WiFi" may be incorrectly interpreted by the non-customized speech-to-text engine as "why fly." As a result, snippets of speech that include the word WiFi may be inaccurately converted to text that includes the phrase "why fly" in place of "WiFi." For instance, "am I near a WiFi hotspot" may be converted to the text "am I near a why fly hotspot." As another non-limiting example, the speech "my WiFi router stopped working" may be converted to the text "my why fly router stopped working." It should be appreciated that numerous other examples of inaccurately converted words/phrases are within the scope of example embodiments of the invention.

Still referring to the example use case scenario from above, words that typically appear in the neighborhood of the word "fly" in the text output of the domain-agnostic speech-to-text engine may include, for example, "airplane," "bird," etc. However, due to the erroneous interpretation of the word "WiFi" as "why fly," other words such as, for example, "hotspot," "router," etc. that are not typically observed in the neighborhood of the word "fly" may begin to appear in the text output. As such, the neighborhoods of the words "fly" and "hotspot" and the neighborhoods of the words "fly" and "router," for example, may be similar, and as a result, [fly, hotspot] and [fly, router] may be identified as synonym clusters. Text snippets that contain these synonym clusters as well as other words in their neighborhoods that provide context may be generated. The text snippets may be, for example, "am I near a why fly hotspot" and "my why fly router stopped working." These text snippets can then be reviewed to identify the erroneous substitution of "why fly" for "WiFi." The domain-agnostic speech-to-text engine can then be re-trained to accurately identify the term "WiFi" in speech. This may include providing a phonetic description of the term as well as its language model. The language model may indicate the probability of a given word following the word "WiFi" and the probability that "WiFi" is the next word following a given word.

Illustrative methods in accordance with example embodiments of the invention and corresponding data structures (e.g., program modules) for performing the methods will now be described. It should be noted that each operation of the method 200 and/or the method 300 may be performed by one or more of the program modules or the like depicted in FIG. 1 or FIG. 4, whose operation will be described in more detail hereinafter. These program modules may be implemented in any combination of hardware, software, and/or firmware. In certain example embodiments of the invention, one or more of these program modules may be implemented, at least in part, as software and/or firmware modules that include computer-executable instructions that when executed by a processing circuit cause one or more operations to be performed. A system or device described herein as being configured to implement example embodiments of the invention may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 2:
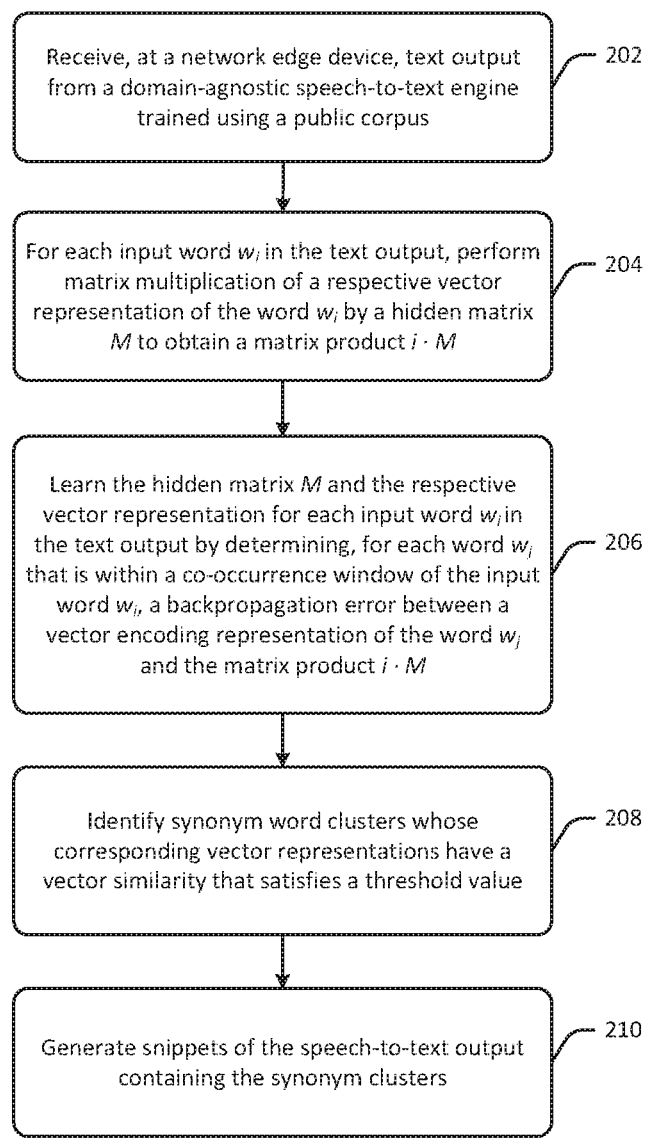
FIG. 2 is a process flow diagram of an illustrative method for identifying, in an automated fashion, one or more potential errors in a text output of a speech-to-text engine using a machine learning technique in accordance with one or more example embodiments of the invention.
Figure 3:
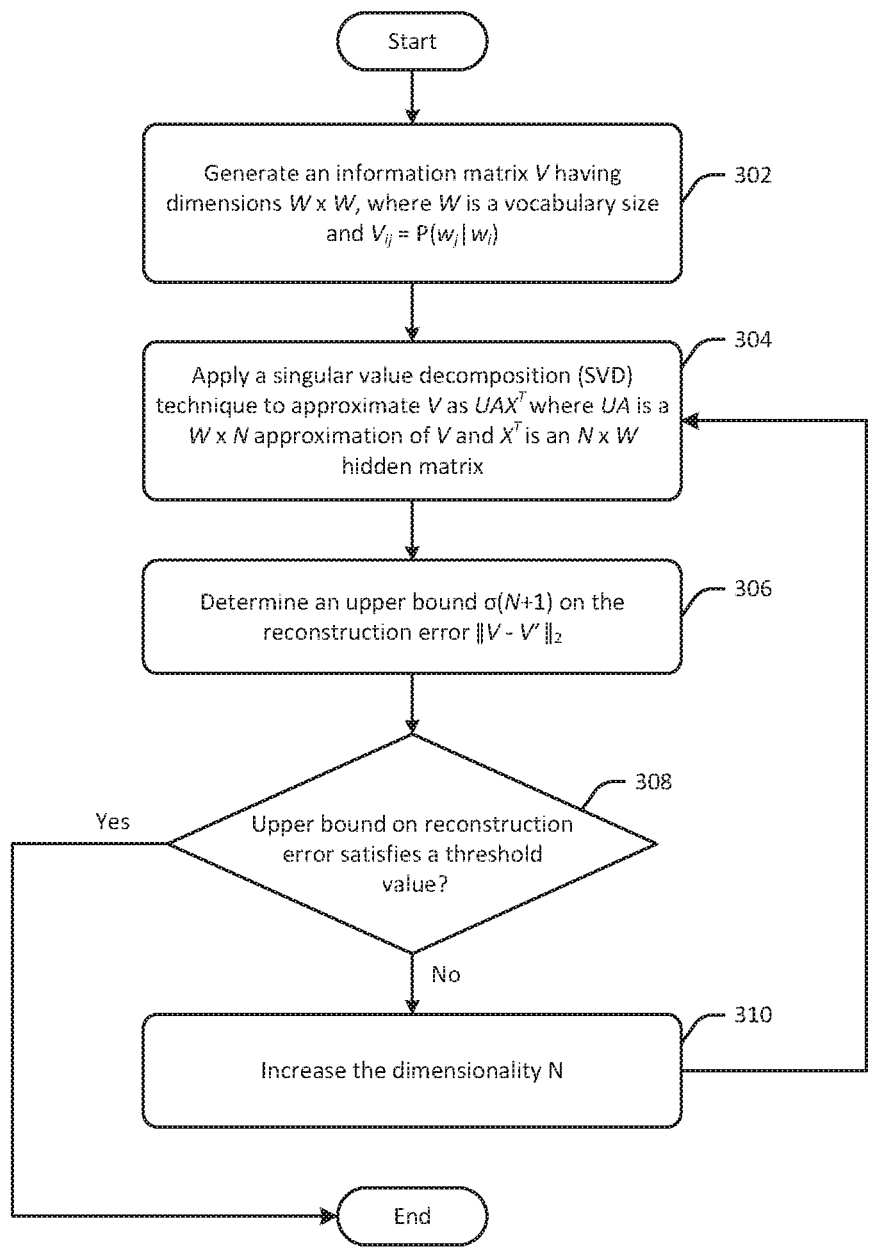
FIG. 3 is a process flow diagram of an illustrative method for identifying, in an automated fashion, one or more potential errors in a text output of a speech-to-text engine using an alternative machine learning technique in accordance with one or more example embodiments of the invention.

FIG. 1 is a schematic hybrid data flow/block diagram illustrating the automated identification of one or more potential errors in a text output of a speech-to-text engine in accordance with one or more example embodiments of the invention. FIG. 2 is a process flow diagram of an illustrative method 200 for identifying, in an automated fashion, one or more potential errors in a text output of a speech-to-text engine using a machine learning technique in accordance with one or more example embodiments of the invention. FIG. 3 is a process flow diagram of an illustrative method 300 for identifying, in an automated fashion, one or more potential errors in a text output of a speech-to-text engine using an alternative machine learning technique in accordance with one or more example embodiments of the invention. Each of FIGS. 2 and 3 will be described in conjunction with FIG. 1 hereinafter.

Referring first to FIG. 2 in conjunction with FIG. 1, in example embodiments of the invention, a network edge device receives a text output 104 from a domain agnostic speech-to-text engine 102, at block 202 of the method 200. In example embodiments of the invention, the domain-agnostic speech-to-text engine 102 is trained on a public corpus such as a news corpus that lacks customization with respect to specific industries. In example embodiments of the invention, the text output 104 is converted from audio of a customer conversation, but may exclude PII of the customer.

In example embodiments of the invention, various program modules/engines may be executable on the network edge device to implement various aspects of the functionality for automatically identifying potential errors in the text output 104. For instance, in example embodiments of the invention, the network edge device may be configured to execute one or more vector representation learning modules 106; one or more synonym cluster identification modules 110; and one or more text snippet generation modules 114. In example embodiments of the invention, one or more of these program modules (e.g., the vector representation learning module(s) 106) may be implemented as a neural network (e.g., a convolutional neural network) or another suitable machine-learning construct.

In example embodiments of the invention, blocks 204 and 206 of the method 200 correspond to operations for learning the vector representations (e.g., vector embeddings) of words in the text output 104. At block 204 of the method 200, in example embodiments of the invention, computer-executable instructions of the vector representation learning module(s) 106 are executed to perform, for each input word $w_i$ in the text output 104, a matrix multiplication of a vector representation i of the input word $w_i$ with a hidden matrix M to obtain a matrix product i·M. Then, at block 206 of the method 200, in example embodiments of the invention, computer-executable instructions of the vector representation learning module(s) 106 are executed to learn the respective vector representation i for each input word $w_i$ and the hidden matrix M by determining for each word $w_j$ that is within a co-occurrence window of the input word $w_i$, a backpropagation error between a one-hot vector encoding representation of the word $w_j$ and the matrix product i·M.

More specifically, assume that the size of a vocabulary of the text output 104 is W, then any input word $w_i \in \{0, 1, \ldots, W-1\}$. Further assume, that the selected embedding size is N. In example embodiments of the invention, the embedding size N is representative of the dimensionality of the vector representation that is learned for each input word $w_i$ and may be much smaller than the vocabulary size, that is, N<<W. Further, let i be a 1×N vector embedding for word $w_i$; M be an N×W hidden matrix; and $1_j$ be a 1×W one-hot encoding vector for the word $w_j$. The one-hot encoding vector for a word $w_j$ may be a vector of dimension W that has a 1 at index j and a 0 at all other indices. Stated more formalistically, $1_j$ is a one-hot encoding vector of dimension W for word $w_j$ such that $1_{jk}=1$ if k=j; 0 otherwise.

The respective vector representation i for each input word $w_i$ is then learned by approximating the one-hot encoding vector $1_j$ for each word $w_j$ that is within a co-occurrence window of the input word $w_i$ using the matrix product of the vector representation i and the hidden matrix M. In example embodiments of the invention, the matrix product i·M is a 1×W vector that ideally includes a 1 at each index j corresponding to a word $w_j$ that is in the neighborhood of the input word $w_i$ and a zero at each other index. In example embodiments of the invention, a neighborhood of an input word $w_i$ may include X number of words that occur before the input word $w_i$ and X number of words that occur after the input word $w_i$, where X represents a skip length for determining whether a word $w_j$ is within a co-occurrence window of a word $w_i$. As such, in example embodiments of the invention, a co-occurrence window may be equivalent to a neighborhood.

In particular, in order to learn the vector representation i for each input word $w_i$, a backpropagation error between the matrix product i·M and a one-hot encoding vector $1_j$ is determined for each word $w_j$ that is within a co-occurrence window of the input word $w_i$. The backpropagation error may be, for example, an L2 norm. More specifically, the backpropagation error may be given by: $\|1_1 - i \cdot M\|_2$. In example embodiments of the invention, the backpropagation error for a given word pair ($w_i$, $w_j$) within a co-occurrence window may be used to update parameters of the vector representation i and the hidden matrix M. The backpropagation error may be calculated for each such word pair ($w_i$, $w_j$) and the parameters of the vector representation i and the hidden matrix M updated until the backpropagation error satisfies a threshold error and the respective vector representation i is learned for each input word $w_i$. The backpropagation error may be determined to satisfy a threshold error if the backpropagation error is less than or equal to the threshold error or is strictly less than the threshold error. In general, as used herein and depending on the particular implementation, a first value satisfies a second value if the first value is strictly greater than the second value; the first value is greater than or equal to the second value; the first value is strictly less than the second value; or the first value is less than or equal to the second value. In example embodiments of the invention, by seeking to minimize the backpropagation error between the one-hot encoding vector $1_j$ and the matrix product i·M, a respective vector representation i is learned for each word $w_i$ and a hidden matrix M is learned such that when a learned vector representation i is multiplied by the learned hidden matrix M, the output is word(s) that appear in the neighborhood of word $w_i$.

In certain example embodiments of the invention, rather than utilizing the matrix product i·M directly in learning the respective vector representation i for each word $w_i$ and the hidden matrix M, a normalization function (e.g., softmax) may be applied to the matrix product i·M as an optimization. In addition, in example embodiments of the invention, other optimizations may be performed. For instance, subsampling may be employed to reduce the weightage applied to words that occur too frequently in the text output 104 (e.g., "a," "the," etc.), which may be less useful in identifying erroneously converted text. In certain example embodiments of the invention, the reduced weight applied to the frequency of a word may be heuristically determined.

At block 208 of the method 200, in example embodiments of the invention, computer-executable instructions of the synonym cluster identification module(s) 110 are executed to identify synonym clusters 112 of words in the text output 104 based at least in part on their learned vector representations 108. More specifically, in example embodiments of the invention, two words $w_a$ and $w_b$ are defined as synonyms, and thus, form part of a synonym cluster 112 if the respective neighborhoods around the words are similar. Stated more formally, two words $w_a$ and $w_b$ form part of a synonym cluster 112 if $\forall j$, $P(w_j|w_a) \approx P(w_j|w_b)$ where $P(w_j|w_i)$ is the conditional probability of occurrence of word $w_j$ within a skip (co-occurrence) window of word $w_i$.

As previously described, a vector representation i for word $w_i$ is learned by minimizing the backpropagation error between the matrix product i·M and the one-hot encoding vector $1_j$ such that i·M$\approx 1_j$. Assume, for explanatory purposes, that a word $w_i$ in the text output 104 is "fly." Further assume that the word "balloon" appears in the neighborhood of a first instance of the word "fly" in the text output 104. Then, ideally multiplying a vector representation corresponding to this instance of the word "fly" by the learned hidden matrix M yields a 1×W vector that is approximately equal to the one-hot encoding vector for "balloon." Then, assume that the word "kite" is in the neighborhood of a second instance of the word "fly" in the text output 104. Ideally, multiplying a vector representation of this second instance of the word "fly" by the learned hidden matrix M yields a 1×W vector that is approximately equal to the one-hot encoding vector for "kite." In example embodiments of the invention, it can then be shown that doing the above for each instance of the word "fly" for each other word that appears in the respective neighborhood of each instance of the word "fly" is equivalent to determining the conditional probability of occurrence of each word $w_j$ within a co-occurrence window of the word "fly." Stated more generally, it can be shown that learning the matrix product i·M with respect to $1_j$ for each $w_j$ that is within a co-occurrence window of word $w_i$ is equivalent to determining $V_i$ where $V_{ij} = P(w_j|w_i)$ where, as noted above, $P(w_j|w_i)$ is the conditional probability of occurrence of word $w_j$ within a skip (co-occurrence) window of word $w_i$. That is, i·M$\approx 1_j$ is equivalent to i·M$\approx V_i$. A brief proof of this equivalency appears below.

Let i·M=$V'_i$. Then, error e=$\Sigma_j P(w_j|w_i)*(1-V'_{ij})^2 + (1-P(w_j|w_i))*V'^2_{ij}$. This error function follows from the notion that we are attempting to minimize the backpropagation error (e.g., the L2 norm) for each instance of $(w_j, w_i)$ in a co-occurrence window and that the respective probabilities of occurrence of a word $w_j$ within a co-occurrence window of word $w_i$ differ for different $w_j$'s. For instance, if the word "balloon" appears three times as often in the text output 104 as the word "kite," this is captured in the error function. Taking the partial derivative of the error function with respect to $V'_{ij}$ then gives $\partial e/\partial V'_{ij} = -2*P(w_j|w_i)*(1-V'_{ij}) + 2*(1-P(w_j|w_i))*V'_{ij}$. Then, setting $\partial e/\partial V'_{ij} = 0$ so as to minimize the error function e gives $V'_{ij} = P(w_j|w_i)$.

Based on the above-described equivalency, in example embodiments of the invention, defining two words $w_a$ and $w_b$ as a synonym cluster 112 if $\forall j$, $P(w_j|w_a) \approx P(w_j|w_b)$ is equivalent to saying that words $w_a$ and $w_b$ form a synonym cluster 112 if $V_a \approx V_b$. Further, for two words, $w_a$ and $w_b$, a·M$\approx V_a$ and b·M$\approx V_b$, based on the equivalency described earlier. It then follows that (a-b)·M$\approx (V_a - V_b)$. Thus, $V_a \approx V_b$—which indicates that words $w_a$ and $w_b$ form part of a synonym cluster 112—implies that (a-b)·M$\approx 0$, which in turn, implies that a b, that is, that the vector representations a and b for words $w_a$ and $w_b$ are approximately equal. The above demonstrates that synonym clusters 112 can be identified based on the corresponding vector representations of the constituent words of the synonym clusters 112.

Referring again to FIG. 2, once the synonym clusters 112 have been identified, they may be provided as input to the text snippet generation module(s) 114. In example embodiments of the invention, computer-executable instructions of the text snippet generation module(s) 114 are executed at block 210 of the method 200 to generate text snippets 116 from the text output 104 based on the synonym clusters 112. More specifically, the text snippets 116 may include the synonym clusters 112 as well as additional words that appear in the neighborhoods of the synonym clusters 112, which serve to provide context for the synonym clusters 112.

In example embodiments of the invention, the text snippets 116 provide a much smaller subset of text than the text output 104 for manual review to identify any potential anomalous synonym relationships. For instance, referring again to the example introduced earlier, "fly" and "hotspot" may be identified as a first synonym cluster 112 in the text output 104 and "fly" and "router" may be identified as a second synonym cluster 112 in the text output 104. Text snippets 116 containing these synonym clusters 112 as well as surrounding words for context (e.g., "my why fly router stopped working," "where is the closest why fly hotspot," etc.) may be reviewed to identify the anomalous relationship between "fly" and "hotspot" and/or "fly" and "router" and thus the erroneous text conversion of "WiFi" as "why fly." In example embodiments of the invention, the words "why" and "fly" may be identified as a synonym cluster 112 and similar text snippets 116 such as those described above may be generated and reviewed to identify the erroneous text conversion of "WiFi" as "why fly." It should be appreciated that the above-described examples of synonym clusters 112 and text snippets 116 are merely illustrative and not exhaustive.

In example embodiments of the invention, the determination as to whether a synonym cluster 112 is representative of an anomalous relationship, and thus, indicative a potential error in the converted text may be made based on a comparison of a similarity measure of the synonym cluster 112 within the text output 104 to a similarity measure of the synonym cluster 112 with respect to a public dataset such as a news corpus. For instance, a synonym cluster 112 such as [fly, hotspot] from the "WiFi"→"why fly" example introduced earlier is likely to have a low similarity measure within the public dataset because the neighborhoods around "fly" and "hotspot" in the public dataset are likely not similar. In this manner, the likelihood that potential errors are discovered by extracting text snippets 116 around the synonym clusters 112 is increased.

In example embodiments of the invention, once the anomalous synonym relationships and erroneous text conversion are identified, the speech-to-text engine 102 may be customized 118 to correctly interpret the speech that was converted to erroneous text by the engine 102. For instance, the speech-to-text engine 102 may be re-trained based on the phonetics and language model of the term "WiFi" to correct interpret speech containing this term as the text "WiFi." In example embodiments of the invention, the method 200 may be iteratively performed as new text output 104 is received to identify potential additional anomalous synonym relationships and corresponding erroneously converted text such that the engine 102 can be continuously re-trained to correctly interpret additional words in the vocabulary.

FIG. 3 is a process flow diagram of an illustrative method 300 for identifying, in an automated fashion, one or more potential errors in a text output of a speech-to-text engine using an alternative machine learning technique than the one described with respect to the method 200 of FIG. 2. The example method 300 of FIG. 3 utilizes a singular value decomposition (SVD) approach that follows from the equivalency noted above between $i \cdot M \approx 1_j$ and $i \cdot M \approx V_i$.

At block 302 of the method 300, in example embodiments of the invention, computer-executable instructions of the vector representation learning module(s) 106 to generate an information matrix V having dimensions W×W, where W is a vocabulary size of the text output 104 and $V_{ij}=P(w_j|w_i)$. In example embodiments of the invention, the information matrix V is a matrix containing the conditional probability of each word in the vocabulary W given each other word in the vocabulary W.

At block 304 of the method 300, in example embodiments of the invention, computer-executable instructions of the vector representation learning module(s) are executed to apply an SVD technique to approximate V as $UAX^T$ where UA is a W×N approximation of V and $X^T$ is an N×W hidden matrix. Each 1×N vector in UA (the lower-dimensional W×N approximation of V) is a learned vector representation (vector embedding) for a respective word in the vocabulary W. Thus, UA represents the vector representation for each word in the vocabulary W.

At block 306 of the method 300, in example embodiments of the invention, computer-executable instructions of the vector representation learning module(s) 106 are executed to determine an upper bound $\sigma(N+1)$ on the reconstruction error $|V-V'|_2$ where $V'=UAX^T$. Using the SVD technique of method 300 allows for an upper bound on the reconstruction error to be determined with respect to the reduced dimensionality N, which is generally not available using a deep-learning approach such as that described in reference to the method 200. That is, given N, an upper bound on the error can be determined with respect to N. Thus, in example embodiments of the invention, the larger that N is, the more the error is reduced. In example embodiments of the invention, $\sigma(0)$ is the highest singular value and decreases sequentially. Stated more generally, $\sigma(N+1)<\sigma(N)$. Thus, as the dimensionality N increases, the upper bound on the reconstruction error decreases and is given by $\sigma(N+1)$.

At block 308 of the method 300, in example embodiments of the invention, computer-executable instructions of the vector representation learning module(s) 106 are executed to determine whether the upper bound on the reconstruction error (i.e., $\sigma(N+1)$) satisfies a threshold value such as a threshold acceptable error. In response to a positive determination, the method 300 ends and UA is accepted as the approximation of V. In response to a negative determination at block 308, in example embodiments of the invention, the dimensionality N is increased at block 310 of the method 300, and the method 300 again proceeds from block 304. The method 300 may thus proceed iteratively until a W×N approximation for V is achieved whose reconstruction error satisfies the threshold error.

In general, the vocabulary size W is large, which implies that the information matrix V, which is W×W, is extremely large. Accordingly, generating the information matrix V may require a large amount of memory and reconstructing the entire information matrix V as $UAX^T$ may require substantial processing resources. Accordingly, in example embodiments of the invention, an auto-encoder may be used to approximate the SVD approach for the entire information matrix V. In example embodiments of the invention, each input to the auto-encoder is $V_i$ which is a 1×W vector from the information matrix V. The output of the auto-encoder may then be a 1×W vector $V'_i$ that is a reconstruction of $V_i$. Each such vector $V'_i$ may be obtained by multiplying a 1×N vector of the W×N approximation of V (i.e. UA) by the N×W hidden matrix $X^T$. The reconstruction error (e.g., backpropagation error)$\|V_i-V'_i\|_2$ can then be determined with respect to each 1×W vector input. In this manner, the respective vector representation $V'_i$ for each word $w_i$ can be determined without having to materialize the information matrix V in its entirely.

Materializing V on a row-by-row basis rather than in its entirety substantially reduces the memory and processing resources required to learn the vector representations of the words in W. This represents an additional technical solution and benefit over conventional approaches for customizing speech-to-text engines because vector representations 108—which are used to identify synonym clusters 112 indicative of potentially anomalous synonym relationships—can be learned more quickly by reducing the amount of memory and/or data storage required to store the information matrix V and reducing the processing resources needed to reconstruct V as V'. This, in turn, allows for erroneously converted text in the text output 104 to be identified more quickly.

Figure 4:
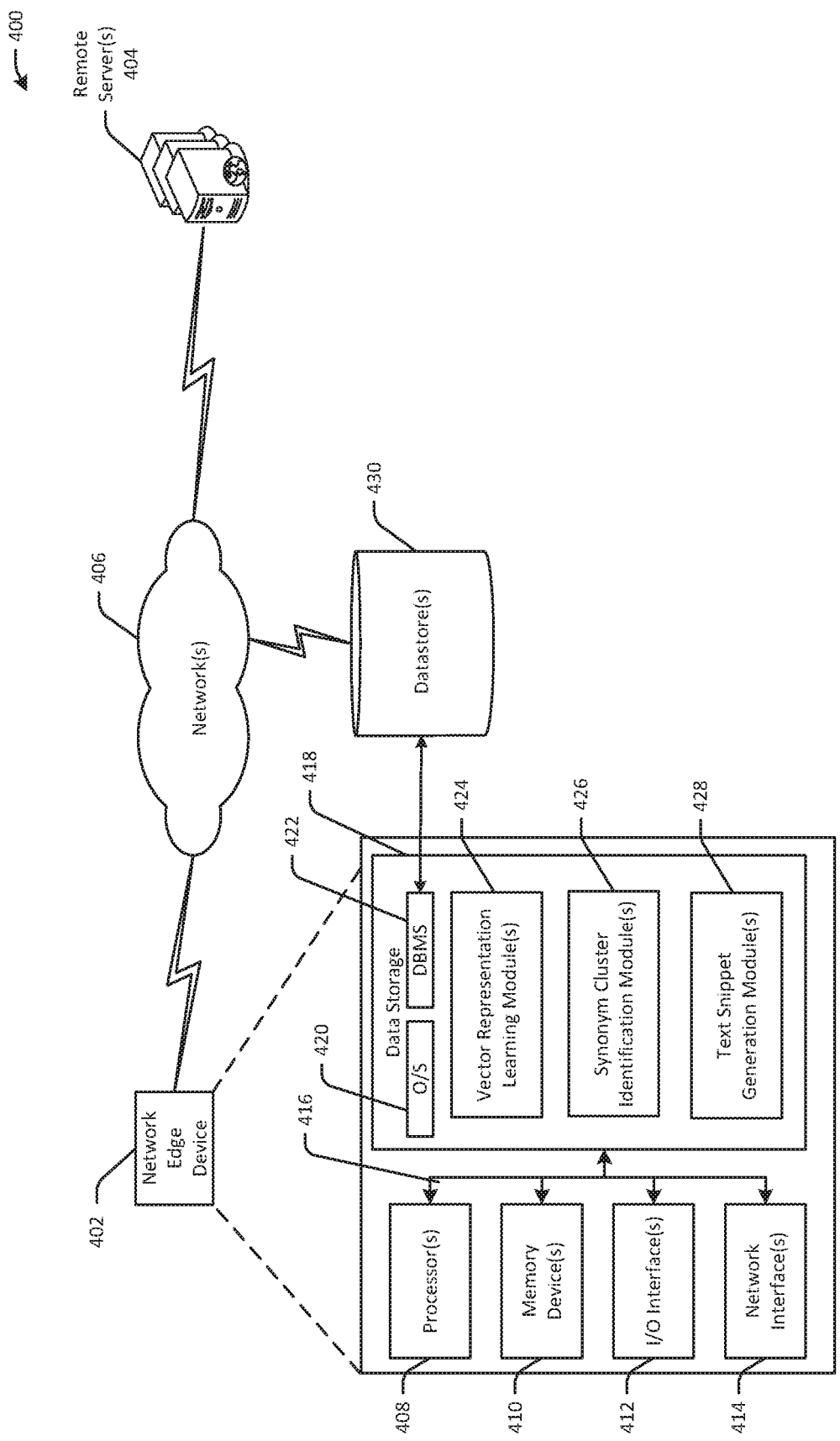
FIG. 4 is a schematic diagram of an illustrative networked architecture configured to implement one or more example embodiments of the invention.

FIG. 4 is a schematic diagram of an illustrative networked architecture 400 configured to implement one or more example embodiments of the disclosure. The illustrative networked architecture 400 includes a network edge device 402 configured to communicate via one or more networks 406 with one or more remote servers 404. The network edge device 402 may include, without limitation, a personal computer (PC), a tablet, a smartphone, a wearable device, a voice-enabled device, or the like. In example embodiments of the invention, the speech-to-text engine 102 may reside on and execute on the remote server(s) 404. The remote server(s) 404 may send the text output 104 generated by the speech-to-text engine 102 to the network edge device 402. While any particular component of the networked architecture 400 may be described herein in the singular, it should be appreciated that multiple instances of any such component may be provided, and functionality described in connection with a particular component may be distributed across multiple ones of such a component.

The network(s) 406 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 406 may have any suitable communication range associated therewith and may include, for example, global networks (e.g., the Internet), metropolitan area networks (MANs), wide area networks (WANs), local area networks (LANs), or personal area networks (PANs). In addition, the network(s) 406 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the network edge device 402 may include one or more processors (processor(s)) 408, one or more memory devices 410 (generically referred to herein as memory 410), one or more input/output ("I/O") interface(s) 412, one or more network interfaces 414, and data storage 418. The network edge device 402 may further include one or more buses 416 that functionally couple various components of the network edge device 402.

The bus(es) 416 may include at least one of a system bus, a memory bus, an address bus, or a message bus, and may permit the exchange of information (e.g., data (including computer-executable code), signaling, etc.) between various components of the network edge device 402. The bus(es) 416 may include, without limitation, a memory bus or a memory controller, a peripheral bus, an accelerated graphics port, and so forth. The bus(es) 416 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 410 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments of the invention, volatile memory may enable faster read/write access than non-volatile memory. However, in certain other example embodiments of the invention, certain types of non-volatile memory (e.g., FRAM) may enable faster read/write access than certain types of volatile memory.

In various implementations, the memory 410 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 410 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 418 may include removable storage and/or non-removable storage including, but not limited to, magnetic storage, optical disk storage, and/or tape storage. The data storage 418 may provide non-volatile storage of computer-executable instructions and other data. The memory 410 and the data storage 418, removable and/or non-removable, are examples of computer-readable storage media (CRSM) as that term is used herein.

The data storage 418 may store computer-executable code, instructions, or the like that may be loadable into the memory 410 and executable by the processor(s) 408 to cause the processor(s) 408 to perform or initiate various operations. The data storage 418 may additionally store data that may be copied to memory 410 for use by the processor(s) 408 during the execution of the computer-executable instructions. Moreover, output data generated as a result of execution of the computer-executable instructions by the processor(s) 408 may be stored initially in memory 410 and may ultimately be copied to data storage 418 for non-volatile storage.

More specifically, the data storage 418 may store one or more operating systems (O/S) 420; one or more database management systems (DBMS) 422 configured to access the memory 410 and/or one or more external datastores 430; and one or more program modules, applications, engines, managers, computer-executable code, scripts, or the like such as, for example, one or more vector representation learning modules 424; one or more synonym cluster identification modules 426; and one or more text snippet generation modules 428. Any of the components depicted as being stored in data storage 418 may include any combination of software, firmware, and/or hardware. The software and/or firmware may include computer-executable instructions (e.g., computer-executable program code) that may be loaded into the memory 410 for execution by one or more of the processor(s) 408 to perform any of the operations described earlier in connection with correspondingly named modules/engines.

Although not depicted in FIG. 4, the data storage 418 may further store various types of data utilized by components of the network edge device 402 (e.g., data stored in the datastore(s) 430). Any data stored in the data storage 418 may be loaded into the memory 410 for use by the processor(s) 408 in executing computer-executable instructions. In addition, any data stored in the data storage 418 may potentially be stored in the external datastore(s) 430 and may be accessed via the DBMS 422 and loaded in the memory 410 for use by the processor(s) 408 in executing computer-executable instructions.

The processor(s) 408 may be configured to access the memory 410 and execute computer-executable instructions loaded therein. For example, the processor(s) 408 may be configured to execute computer-executable instructions of the various program modules, applications, engines, managers, or the like of the network edge device 402 to cause or facilitate various operations to be performed in accordance with one or more embodiments of the disclosure. The processor(s) 408 may include any suitable processing unit capable of accepting data as input, processing the input data in accordance with stored computer-executable instructions, and generating output data. The processor(s) 408 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 408 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 408 may be capable of supporting any of a variety of instruction sets.

Referring now to other illustrative components depicted as being stored in the data storage 418, the O/S 420 may be loaded from the data storage 418 into the memory 410 and may provide an interface between other application software executing on the network edge device 402 and hardware resources of the network edge device 402. More specifically, the O/S 420 may include a set of computer-executable instructions for managing hardware resources of the network edge device 402 and for providing common services to other application programs. In certain example embodiments of the invention, the O/S 420 may include or otherwise control the execution of one or more of the program modules, engines, managers, or the like depicted as being stored in the data storage 418. The O/S 420 may include any operating system now known or which may be developed in the future including, but not limited to, any server operating system, any mainframe operating system, or any other proprietary or non-proprietary operating system.

The DBMS 422 may be loaded into the memory 410 and may support functionality for accessing, retrieving, storing, and/or manipulating data stored in the memory 410, data stored in the data storage 418, and/or data stored in external datastore(s) 430. The DBMS 422 may use any of a variety of database models (e.g., relational model, object model, etc.) and may support any of a variety of query languages. The DBMS 422 may access data represented in one or more data schemas and stored in any suitable data repository. Data stored in the datastore(s) 430 may include, for example, the text output 104; the learned vector representations 108; the synonym clusters 112; the text snippets 116; and so forth, any portion of which may alternatively or additionally be stored in the data storage 418. External datastore(s) 430 that may be accessible by the network edge device 402 via the DBMS 422 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the network edge device 402, the input/output (I/O) interface(s) 412 may facilitate the receipt of input information by the network edge device 402 from one or more I/O devices as well as the output of information from the network edge device 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the network edge device 402 or may be separate. The I/O devices may further include, for example, any number of peripheral devices such as data storage devices, printing devices, and so forth.

The I/O interface(s) 412 may also include an interface for an external peripheral device connection such as universal serial bus (USB), FireWire, Thunderbolt, Ethernet port or other connection protocol that may connect to one or more networks. The I/O interface(s) 412 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The network edge device 402 may further include one or more network interfaces 414 via which the network edge device 402 may communicate with any of a variety of other systems, platforms, networks, devices, and so forth. The network interface(s) 414 may enable communication, for example, with one or more other devices via one or more of the network(s) 406.

It should be appreciated that the program modules/engines depicted in FIG. 4 as being stored in the data storage 418 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the network edge device 402 and/or other computing devices (e.g., one or more of the remote server(s) 404) accessible via the network(s) 406, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the network edge device 402 may include alternate and/or additional hardware, software, or firmware components beyond those described or depicted without departing from the scope of the disclosure. More particularly, it should be appreciated that software, firmware, or hardware components depicted as forming part of the network edge device 402 are merely illustrative and that some components may not be present or additional components may be provided in various embodiments of the invention. While various illustrative modules have been depicted and described as software modules stored in data storage 418, it should be appreciated that functionality described as being supported by the modules may be enabled by any combination of hardware, software, and/or firmware. It should further be appreciated that each of the above-mentioned modules may, in various embodiments of the invention, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments of the invention, be provided at least in part by one or more other modules. Further, one or more depicted modules may not be present in certain embodiments of the invention, while in other embodiments of the invention, additional program modules and/or engines not depicted may be present and may support at least a portion of the described functionality and/or additional functionality.

One or more operations the method 200 and/or the method 300 may be performed by one or more network edge devices 402 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative methods of FIGS. 2 and 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2 and 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for automated identification of one or more potential errors in a text output of a speech-to-text engine, the method comprising:
   receiving, using a processor, the text output of the speech-to-text engine;
   determining, using the processor, a first vector representation of a first word in the text output;
   determining, using the processor, a second vector representation of a second word in the text output;
   determining, using the processor, that the first vector representation and the second vector representation satisfy a similarity threshold;
   determining that the first word and the second word form a synonym cluster based at least in part on determining that the first vector representation and the second vector representation satisfy the similarity threshold, wherein the synonym cluster is indicative of a potential error in the text output; and
   generating a text snippet from the text output, wherein the text snippet comprises at least the first word and the second word.

2. The computer-implemented method of claim 1, wherein the first word and the second word forming a synonym cluster indicates that respective probabilities that one or more other words are in a first neighborhood of the first word are approximately equal to respective probabilities that the one or more other words are in a second neighborhood of the second word.

3. The computer-implemented method of claim 1, further comprising learning the first vector representation of the first word, wherein learning the first vector representation comprises:
   performing matrix multiplication of the first vector representation with a hidden matrix to obtain a matrix product;
   determining, for each other word in the text output that is within a co-occurrence window of the first word, a respective backpropagation error between the matrix product and a respective vector encoding representation of the each other word; and
   adjusting one or more parameters of the first vector representation until each respective backpropagation error satisfies a threshold value.

4. The computer-implemented method of claim 1, further comprising determining that the synonym cluster is indicative of an error in the text output by determining that the synonym cluster fails to satisfy the similarity threshold with respect to a public dataset.

5. The computer-implemented method of claim 1, further comprising learning the first vector representation of the first word, wherein learning the first vector representation comprises:
   generating an information matrix V having dimensions W×W, wherein W is a size of a vocabulary associated with the speech-to-text engine, and wherein each entry of the information matrix V is a conditional probability that a respective word in the vocabulary appears in a respective neighborhood of another respective word in the vocabulary; and
   applying a singular value decomposition technique to approximate V as $UAX^T$, wherein UA is a W×N matrix approximation of V and $X^T$ is a N×W hidden matrix, wherein a particular row of UA represents the first vector representation of the first word.

6. The computer-implemented method of claim 5, wherein learning the first vector representation of the first word further comprises:
   determining an upper bound on a reconstruction error between the information matrix V and the approximation $UAX^T$;
   determining that the upper bound does not satisfy a threshold value;
   increasing the dimensionality N; and
   re-applying the singular value decomposition technique to approximate V as $UAX^T$.

7. The computer-implemented method of claim 1, wherein determining that the first vector representation and the second vector representation satisfy a similarity threshold comprises:
   determining a similarity metric between the first vector representation and the second vector representation; and
   determining that the similarity metric satisfies a threshold value.

8. The computer-implemented method of claim 1, wherein it is determined that the first word is an erroneous output of the speech-to-text engine, and wherein the speech-to-text engine is customized to correctly recognize the first word.

9. A system for automated identification of one or more potential errors in a text output of a speech-to-text engine, the system comprising:
   at least one processor; and
   at least one memory storing computer-executable instructions, wherein the at least one processor is configured to access the at least one memory and execute the computer-executable instructions to:

receive the text output of the speech-to-text engine;

determine a first vector representation of a first word in the text output;

determine a second vector representation of a second word in the text output;

determine that the first vector representation and the second vector representation satisfy a similarity threshold;

determine that the first word and the second word form a synonym cluster based at least in part on determining that the first vector representation and the second vector representation satisfy the similarity threshold, wherein the synonym cluster is indicative of a potential error in the text output; and generate a text snippet from the text output, wherein the text snippet comprises at least the first word and the second word.

10. The system of claim 9, wherein the first word and the second word forming a synonym cluster indicates that respective probabilities that one or more other words are in a first neighborhood of the first word are approximately equal to respective probabilities that the one or more other words are in a second neighborhood of the second word.

11. The system of claim 9, wherein the at least one processor is further configured to execute the computer-executable instructions to learn the first vector representation of the first word, and wherein the at least one processor is configured to learn the first vector representation by executing the computer-executable instructions to:

perform matrix multiplication of the first vector representation with a hidden matrix to obtain a matrix product;

determine, for each other word in the text output that is within a co-occurrence window of the first word, a respective backpropagation error between the matrix product and a respective vector encoding representation of the each other word; and adjust one or more parameters of the first vector representation until each respective backpropagation error satisfies a threshold value.

12. The system of claim 11, wherein the at least one processor is further configured to execute the computer-executable instructions to learn the hidden matrix, wherein the at least one processor is configured to learn the hidden matrix by executing the computer-executable instructions to adjust one or more parameters of the hidden matrix until each respective backpropagation error satisfies a threshold value.

13. The system of claim 9, wherein the at least one processor is further configured to learn the first vector representation of the first word, wherein the at least one processor is configured to learn the first vector representation by executing the computer-executable instructions to:

generate an information matrix V having dimensions W×W, wherein W is a size of a vocabulary associated with the speech-to-text engine, and wherein each entry of the information matrix V is a conditional probability that a respective word in the vocabulary appears in a respective neighborhood of another respective word in the vocabulary; and apply a singular value decomposition technique to approximate V as $UAX^T$, wherein UA is a W×N matrix approximation of V and $X^T$ is a N×W hidden matrix, wherein a particular row of UA represents the first vector representation of the first word.

14. The system of claim 13, wherein the at least one processor is further configured to learn the first vector representation of the first word by executing the computer-executable instructions to:

determine an upper bound on a reconstruction error between the information matrix V and the approximation $UAX^T$;

determine that the upper bound does not satisfy a threshold value;

increase the dimensionality N; and re-apply the singular value decomposition technique to approximate V as $UAX^T$.

15. The system of claim 9, wherein the at least one processor is configured to determine that the first vector representation and the second vector representation satisfy the similarity threshold by executing the computer-executable instructions to:

determine a similarity metric between the first vector representation and the second vector representation; and determine that the similarity metric satisfies a threshold value.

16. A computer program product for automated identification of one or more potential errors in a text output of a speech-to-text engine, the computer program product comprising a storage medium readable by a processing circuit, the storage medium storing instructions executable by the processing circuit to cause the processing circuit to perform a method comprising:

receiving the text output of the speech-to-text engine;

determining a first vector representation of a first word in the text output;

determining a second vector representation of a second word in the text output;

determining that the first vector representation and the second vector representation satisfy a similarity threshold;

determining that the first word and the second word form a synonym cluster based at least in part on determining that the first vector representation and the second vector representation satisfy the similarity threshold, wherein the synonym cluster is indicative of a potential error in the text output; and generating a text snippet from the text output, wherein the text snippet comprises at least the first word and the second word.

17. The computer program product of claim 16, wherein the first word and the second word forming a synonym cluster indicates that respective probabilities that one or more other words are in a first neighborhood of the first word are approximately equal to respective probabilities that the one or more other words are in a second neighborhood of the second word.

18. The computer program product of claim 16, the method further comprising learning the first vector representation of the first word, wherein learning the first vector representation comprises:

performing matrix multiplication of the first vector representation with a hidden matrix to obtain a matrix product;

determining, for each other word in the text output that is within a co-occurrence window of the first word, a respective backpropagation error between the matrix product and a respective vector encoding representation of the each other word; and adjusting one or more parameters of the first vector representation until each respective backpropagation error satisfies a threshold value.

19. The computer program product of claim 18, the method further comprising learning the hidden matrix by adjusting one or more parameters of the hidden matrix until each respective backpropagation error satisfies a threshold value.

20. The computer program product of claim 16, the method further comprising learning the first vector representation of the first word, wherein learning the first vector representation comprises:

generating an information matrix V having dimensions W×W, wherein W is a size of a vocabulary associated with the speech-to-text engine, and wherein each entry of the information matrix V is a conditional probability that a respective word in the vocabulary appears in a respective neighborhood of another respective word in the vocabulary; and applying a singular value decomposition technique to approximate V as $UAX^T$, wherein UA is a W×N matrix approximation of V and $X^T$ is a N×W hidden matrix, wherein a particular row of UA represents the first vector representation of the first word.

* * * * *